(12) United States Patent
Brodd et al.

(10) Patent No.: US 7,910,234 B2
(45) Date of Patent: Mar. 22, 2011

(54) MAGNETIC RECORDING MEDIUM HAVING IMPROVED DURABILITY FOR HIGH DENSITY APPLICATIONS

(75) Inventors: Adam A. Brodd, Minneapolis, MN (US); Bruce H. Edwards, White Bear Lake, MN (US); Brian D. Brong, Oakdale, MN (US); David C. Lowery, Roberts, WI (US)

(73) Assignee: Imation Corp., Oakdale, MN (US)

( * ) Notice: Subject to any disclaimer, the term of this patent is extended or adjusted under 35 U.S.C. 154(b) by 1000 days.

(21) Appl. No.: 11/413,821

(22) Filed: Apr. 28, 2006

(65) Prior Publication Data
US 2007/0254190 A1  Nov. 1, 2007

(51) Int. Cl.
  G11B 5/66 (2006.01)
  G11B 5/842 (2006.01)

(52) U.S. Cl. ............ 428/840; 428/842; 428/843.3; 427/127; 427/130; 264/413; 264/429

(58) Field of Classification Search ............ None
See application file for complete search history.

(56) References Cited

U.S. PATENT DOCUMENTS

| | | | | |
|---|---|---|---|---|
| 4,678,705 A | * | 7/1987 | Huisman et al. | 428/315.9 |
| 5,741,403 A | * | 4/1998 | Tenhover et al. | 204/192.2 |
| 5,972,461 A | * | 10/1999 | Sandstrom | 428/848.9 |
| 6,146,755 A | * | 11/2000 | Guha et al. | 428/332 |
| 6,194,045 B1 | * | 2/2001 | Annacone et al. | 428/64.1 |
| 6,673,475 B2 | | 1/2004 | Oikawa et al. | |
| 6,821,574 B2 | | 11/2004 | Ebner et al. | |
| 2003/0031895 A1 | * | 2/2003 | Kamigaki et al. | 428/694 BA |
| 2003/0108772 A1 | | 6/2003 | Noguchi et al. | |
| 2003/0228493 A1 | * | 12/2003 | Doushita et al. | 428/694 BA |
| 2004/0115454 A1 | * | 6/2004 | Lowery et al. | 428/492 |
| 2004/0234817 A1 | * | 11/2004 | Edwards | 428/694 BN |
| 2004/0253481 A1 | * | 12/2004 | Larson et al. | 428/693 |
| 2005/0053804 A1 | | 3/2005 | Kato | |

FOREIGN PATENT DOCUMENTS

JP  2004-319015 A  11/2004
JP  2004-319016 A  11/2004

OTHER PUBLICATIONS

Co-pending U.S. Appl. No. 11/143,014, filed Jun. 1, 2005 entitled "Magnetic Recording Medium Defining a Recording Surface Having Improved Smoothness Characteristics," Edwards et al.
Sun StorageTek™ T10000 Tape Drive Data Sheet, Sun Microsystems, TC 0049 C, dated Mar. 2006, pp. 1-4.
Sun StorageTek™ T10000 Tape Cartridge Data Sheet, Sun Microsystems, TC 0038 B, dated Oct. 2005, pp. 1-2.
Sun/StorageTek™ T10000 Tape Drive Technical Brief, Sun Microsystems, TT 0014 A, dated Oct. 2005, pp. 1-8.

* cited by examiner

*Primary Examiner* — Kevin M Bernatz
(74) *Attorney, Agent, or Firm* — Shumaker & Sieffert, P.A.

(57) ABSTRACT

A magnetic recording tape includes an elongated substrate and a magnetic side. The magnetic side includes a support layer formed over the substrate and a magnetic recording layer formed over the support layer to define a magnetic recording surface opposite the substrate. The magnetic recording layer includes magnetic particles and a lubricant and supports a net uncompressed density of at least 30 MB/in$^2$. The magnetic side has an extracted BET surface area of greater than 1.0 m$^2$/g.

18 Claims, 5 Drawing Sheets

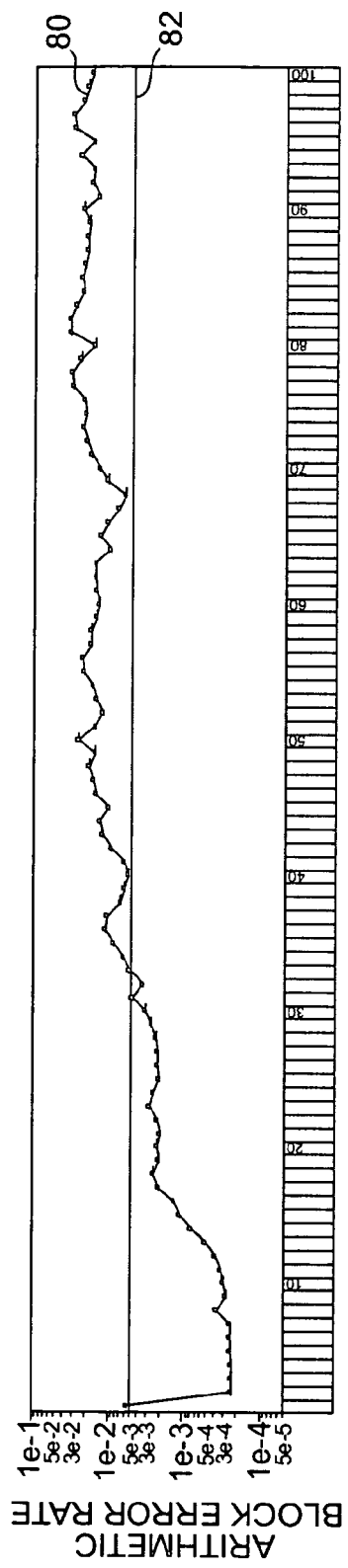
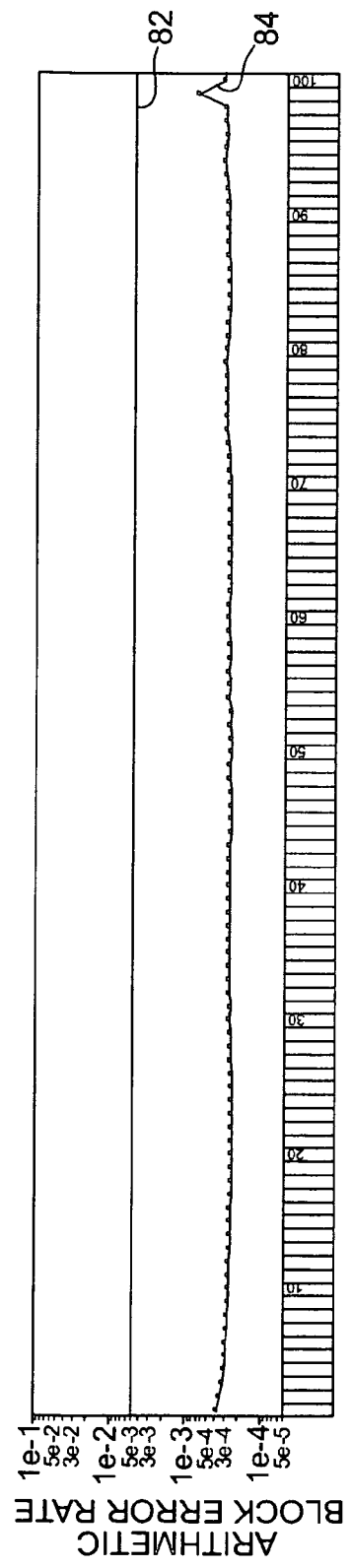

MAGNETIC RECORDING MEDIUM HAVING IMPROVED DURABILITY FOR HIGH DENSITY APPLICATIONS

THE FIELD OF THE INVENTION

The present invention relates to magnetic recording media, such as magnetic recording tapes, for high density applications configured to have improved durability.

BACKGROUND

Magnetic recording media are widely used in audio tapes, video tapes, computer tapes, disks, and the like. Magnetic recording media may use thin, metal layers as the recording layers, or many comprise particulate magnetic compounds as the recording layer. The latter type of magnetic recording media employs particulate material such as ferromagnetic iron oxides, chromium oxides, ferromagnetic alloy powders, and the like, dispersed in binders and coated on a substrate.

In general terms, magnetic recording media generally comprise a magnetic layer coated onto at least one side of a non-magnetic substrate (e.g., a film for magnetic recording tape applications). In certain designs, the magnetic coating is formed as a single layer directly onto the non-magnetic substrate. In an alternative approach, a dual-layer construction is employed, including a lower support layer on the substrate and a thin magnetic recording layer on the lower support layer. The two layers may be formed simultaneously or sequentially. With this type of construction, the lower support layer is generally thicker than the magnetic layer.

The support layer is typically non-magnetic and generally comprised of a non-magnetic powder dispersed in a binder. Conversely, the magnetic recording layer comprises one or more magnetic metal particle powders or pigments dispersed in a binder system. With this in mind, the magnetic recording layer defines a recording surface and is configured to record and store information.

Magnetic tapes may also have a backside coating applied to the opposing side of the non-magnetic substrate in order to improve the durability, electro-conductivity, and tracking characteristics of the media. The backside coating is typically non-magnetic and generally comprised of non-magnetic powders dispersed in a binder system and typically combined with suitable solvents to create a homogenous mixture. The dispersion is then coated onto the substrate, dried, calendered if desired, and subsequently cured.

Magnetic recording tapes continue to evolve as density and capacity demands increase. In order to increase the density of such tapes, tape manufacturers typically strive to provide a magnetic recording tape with as smooth a recording surface as possible. To increase the smoothness of a surface (i.e., to decrease the roughness characteristic), magnetic recording tapes are calendered by steel and/or compliant rollers to compress the components of the magnetic recording tape. Conventional calendering includes heating the rollers to high temperatures (e.g., temperatures greater than 160° F. (71.1° C.)) and compressing the magnetic recording tape between adjacent rollers with pressures of greater than 2500 lbs/in (437.7 N/mm) of tape width. Typically, such calendering results in a magnetic recording tape with a dense magnetic recording layer enabling increased recording density and decreased error rates relative to non-calendered media. However, such calendering can serve to effectively seal off the recording surface from porosity extending throughout the remainder of a magnetic side of the magnetic recording tape which in turn inhibits the migration of lubricant to the surface of the magnetic recording layer thereby limiting durability.

Although the magnetic recording tapes described above are configured with a high recording density, it is desired to increase the durability and life span of high recording density magnetic recording tapes.

SUMMARY

One aspect of the present invention relates to a magnetic recording tape including an elongated substrate and a magnetic side. The magnetic side includes a support layer formed over the substrate and a magnetic recording layer formed over the support layer to define a magnetic recording surface opposite the substrate. The magnetic recording layer includes magnetic particles and a lubricant and supports a net uncompressed density of at least 30 MB/in$^2$. The magnetic recording side has an extracted BET surface area of greater than 1.0 m$^2$/g.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

FIG. 5 is a graph illustrating test results for a conventional magnetic recording medium; and FIG. 6 is a graph illustrating test results for a magnetic recording medium in accordance with the embodiments described herein.

DETAILED DESCRIPTION

In the following detailed description, specific embodiments are described in which the invention may be practiced. It is to be understood that other embodiments may be utilized and structural or logical changes may be made without departing from the scope of the present invention. The following detailed description, therefore, describes certain embodiments and is not to be taken in a limiting sense. The scope of the present invention is defined by the appended claims.

Magnetic recording tapes according to the embodiments described herein are formed and processed with low pressure and/or low temperature calendering such that a level of the porosity of the magnetic recording tape is maintained at a level configured to maintain increased amounts of lubricants as compared to other high density recording media. The increased levels of lubricant are at least partially embedded within a magnetic side of the magnetic recording media to more consistently maintain the recording surface of the magnetic recording medium as a lubricated surface, which, in turn, increases the durability (i.e., the life span) of the magnetic recording tape.

Figure 1:
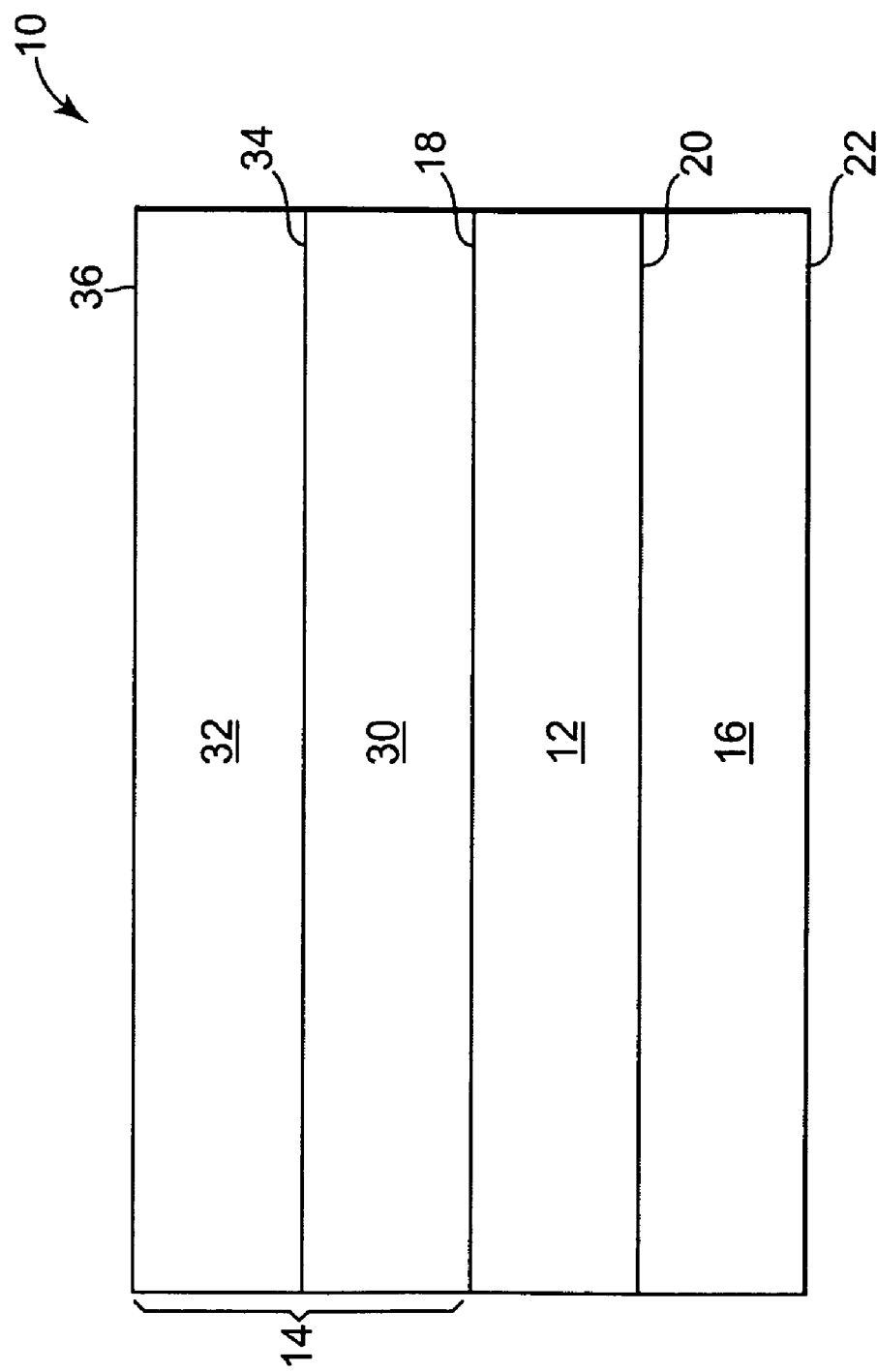
FIG. 1 is a schematic illustration of a cross-sectional view of one embodiment of a magnetic recording medium.

Turning to the figures, FIG. 1 illustrates a schematic, cross-sectional view of a magnetic recording medium in the form of a magnetic recording tape 10. The magnetic recording tape 10 generally includes a substrate 12, a magnetic side 14, and a backcoat or backside 16. The substrate 12 defines a first or top surface 18 and a back or bottom surface 20 opposite top surface 18. The magnetic side 14 generally extends over and is bonded to top surface 18 of the substrate 12. The magnetic side 14 provides the recordable material to the magnetic recording tape 10. The backside 16 generally extends under and is bonded to the bottom surface 20 of the substrate 12 to define a backside surface 22 opposite the substrate 12. The backside 16 generally provides support for the magnetic recording tape 10. In one embodiment, the magnetic recording tape 10 is a magnetic recording tape.

In one embodiment, the magnetic recording tape 10 is specifically processed and configured to be useful in high density recording applications, such as for use with T10000, LTO3, LTO4, LTO5, Quantum S5, Quantum S6, 3592, or any other suitably designed magnetic recording tape drives, while simultaneously providing a durable tape. In one embodiment, the magnetic recording tape 10 supports a net uncompressed density of at least 30 MB/in$^2$ utilizing a linear density of at least 200 kbpi.

In "net uncompressed density," the term "net" refers to the number of bits available to the user that are essentially error free, where bits are considered to be essentially error free when they have a probability of error of less than $10^{-14}$. To achieve this low error rate, error correction coding (ECC) is used in tape drives. ECC writes redundant bits that are subsequently called upon if errors occur. In calculating the net uncompressed density discussed herein, a bit redundancy of 25% is used, thus the net number of error free bits is approximately 75% of the "raw" number of bits on tape.

The term "uncompressed" in "net uncompressed density" indicates that we are referring to actual, random, and uncorrelated user bits. Many tape drives use a data processing technique called "compression" where computer data is first examined and as much redundancy in the data is removed as is possible. With typical text data, the data can be reduced in size by these methods, so that the compressed data set is one-half to one-third of the original size. By stating the density is "uncompressed," it is emphasized that we are not using compression techniques in our discussion.

Linear density is defined as the number of recorded bits per unit length in the direction of tape travel. The number of recording bits includes both useful data and error-correction overhead, but excludes channel coding bit overhead and is, therefore, from 89% to 99% of the raw written bit density. Notably, in a preferred embodiment, a channel coding method is utilized that is greater than 99% efficient and, therefore, the terms "bits," "raw bits," and "data bits" are often used interchangeably.

In addition, the magnetic recording tape 10 is formed with a relatively high porosity, especially in the magnetic side 14, to increase lubricant storage and mobility. For instance, in one example, the magnetic side 14 has an extracted BET surface area (i.e., the surface area calculated using the Brunauer, Emmett, and Teller method using physical adsorption of gas molecules) of greater than 1.0 m$^2$/g, more preferably, greater than 2.0 m$^2$/g. In one embodiment, the extracted BET surface area of the magnetic side is greater than 2.5 m$^2$/g. The increased storage and mobility of lubricant allows lubricant at a recording surface of the tape to be gradually replenished with lubricant from the pores. In this manner, the magnetic recording tape 10 is properly lubricated for a longer period of time, thereby, increasing the durability and life span of the magnetic recording tape 10.

In one embodiment in which the magnetic recording tape 10 is included in a T10000 tape cartridge (for example, as available from StorageTek of Louisville, Colo.), the magnetic recording tape 10 conforms to specifications required for such use. In particular, such magnetic recording tape 10 has a 0.5 inch form factor (i.e., width), is less than 10 microns thick, and the magnetic side 14 is configured to support at least a 30 MB/in$^2$ net uncompressed density utilizing a linear density of at least 200 kbpi. In one embodiment, the magnetic recording tape supports at least a 60 MB/in$^2$ net uncompressed density utilizing a linear density of at least 275 kbpi. In one embodiment, the magnetic recording tape 10 supports at least 750 data tracks, more preferably, at least 1100 data tracks.

The Substrate

The substrate 12 can be any conventional non-magnetic substrate useful as a magnetic recording medium support. In one embodiment, the substrate 12 is about 0.5 inches (1.27 cm) wide and has a thickness between 177 microinches (4.5 µm) and 205 microinches (5.21 µm). Examples of substrate materials useful for the magnetic recording tape 10 include polyesters such as polyethylene terephthalate (PET), polyethylene naphthalate (PEN), a mixture of polyethylene terephthalate and polyethylene naphthalate; polyolefins (e.g., polypropylene); cellulose derivatives; polyamides; and polyimides. In one example, PET or PEN is preferably employed as the substrate 12. In general, the substrate 12 is in elongated tape form or configured to subsequently be cut into elongated tape form.

The Magnetic Side

In one embodiment, the magnetic side 14 is formed of dual-layer construction. Accordingly, the magnetic side 14 includes a support or lower layer 30 and a magnetic recording or upper layer 32. The support layer 30 extends over the top surface 18 of the substrate 12. In one embodiment, the support layer 30 is directly bonded to the substrate 12, while in other embodiments the support layer 30 is bonded to the substrate via an intermediate layer (not shown), such as a primer layer. The support layer 30 defines a top surface 34 opposite the substrate 12.

The magnetic recording layer 32 extends over the top surface 34 of the support layer 30. In one embodiment, the magnetic recording layer 32 is directly bonded to the top surface 34 of the support layer. As such, the magnetic recording layer 32 defines an outer or recording surface 36 opposite the support layer 30. The terms "layer" and "coating" are used interchangeably herein to refer to a coated composition.

The Support Layer

In one embodiment, the composition making up the support layer 30 includes at least a primary pigment material and conductive carbon black and is essentially non-magnetic. Accordingly, the primary pigment material includes a non-magnetic or soft magnetic powder. As used herein, the term "soft magnetic powder" refers to a magnetic powder having a coercivity of less than about 23.9 kA/m (300 Oe). By forming the support layer 30 to be essentially non-magnetic, the electromagnetic characteristics of the magnetic recording layer 32 are not substantially adversely affected. However, to the extent that no substantial adverse effect is caused, the support layer 30 may contain a small amount of magnetic powder. In one embodiment, the primary pigment material consists of particular material, or "particle" selected from a non-magnetic particles, such as iron oxides, titanium dioxide, titanium monoxide, alumina, tin oxide, titanium carbide, silicon carbide, silicon dioxide, silicon nitride, boron nitride, etc., and soft magnetic particles. Optionally, these primary pigment materials are provided in a form coated with carbon, tin, or other electro-conductive material.

In one embodiment, the primary pigment material is formed of a non-magnetic α-iron oxide, which can be acidic or basic in nature. In one example, the non-magnetic α-iron oxides are substantially uniform in particle size, or are a metal-use starting material that is dehydrated by heating, and annealed to reduce the number of pores. After annealing, the primary pigment material is ready for surface treatment, which is generally performed prior to mixing with other materials in the support layer 30 (e.g., the carbon black, etc.). In one embodiment, the particle length of non-magnetic α-iron oxides or other primary pigment particles is less than 150 nm, preferably less than 120 nm. In one example, the α-iron oxides or other primary pigment particles are included in the support layer 30 with a volume concentration of greater than about 35%, preferably greater than about 40%. Notably, component volume percents as used throughout this description were calculated by converting relative formulation materials mass fractions by their pure component densities to obtain relative material volumes. The component volume percent was obtained by dividing these relative material volumes by the ratio of their sum to 100.

α-iron oxides are well known and are commercially available from companies such as Dowa Mining Company Ltd. of Tokyo, Japan; Toda Kogyo Corp. of Hiroshima, Japan; and Sakai Chemical Industry Co. of Osaka, Japan. The conductive carbon black material provides a certain level of conductivity so as to prohibit the magnetic recording layer 32 from charging with static electricity and provides additional compressibility to the magnetic side 14. The conductive carbon black material is preferably of a conventional type and is widely commercially available.

In one embodiment, the conductive carbon black material has an average primary particle size of less than about 20 nm, more preferably about 15 nm. In one example, the conductive carbon black is added in amounts of from about 4 to about 10 parts by weight, more preferably from about 5 to about 8 parts by weight, based on 100 parts by weight of the primary pigment material (e.g., α-iron oxide). The total amount of conductive carbon black and electroconductive coating material in the support layer 30 is preferably sufficient to contribute to providing a resistivity of the magnetic side 14 suitable for use on advance magnetoresistive (MR) heads. In one embodiment, the resistivity of the magnetic side 14 is less than about $1 \times 10^8$ ohm/cm$^2$, preferably less than $5 \times 10^7$ ohms/cm$^2$, more preferably less than $1 \times 10^7$ ohms/cm$^2$.

The support layer 30 can also include additional pigment components such as an abrasive or head cleaning agent (HCA). In one embodiment, the head cleaning agent component is aluminum oxide. Other abrasive grains, such as silica, $ZrO_2$, $Cr_2O_3$, etc., can also be employed as at least part of the head cleaning agent.

In one embodiment, the binder system associated with the support layer 30 incorporates at least one binder resin, such as a thermoplastic resin, in conjunction with other resin components such as binders and surfactants used to disperse the head cleaning agent, a surfactant (or wetting agent), and one or more hardeners. In one embodiment, the binder system of the support layer 30 includes a combination of a primary polyurethane resin and a vinyl chloride resin, a vinyl chloride-vinyl acetate copolymer, vinyl chloride-vinyl acetate-vinyl alcohol copolymer, vinyl chloride-vinyl acetate-maleic anhydride, or the like.

In one embodiment, the vinyl resin is a nonhalogenated vinyl copolymer. Useful vinyl copolymers include copolymers of monomers comprising (meth)acrylonitrile; a nonhalogenated, hydroxyl functional vinyl monomer; a nonhalogenated vinyl monomer bearing a dispersing group, and one or more nonhalogenated nondispersing vinyl monomers. One example of a nonhalogenated vinyl copolymer is a copolymer of monomers comprising 5 to 40 parts by weight of methacrylonitrile, 30 to 80 parts by weight of one or more nonhalogenated, nondispersing, vinyl monomers, 5 to 30 parts by weight of a nonhalogenated hydroxyl functional, vinyl monomer, and 0.25 to 10 parts by weight of a nonhalogenated, vinyl monomer bearing a dispersing group.

Examples of useful polyurethanes include polyester-polyurethane, polyether-polyurethane, polycarbonate-polyurethane, polyester-polycarbonate-polyurethane, and polycaprolactone-polyurethane. Other resins such as bisphenol-A epoxide, styrene-acrylonitrile, and nitrocellulose are also acceptable for use in the support layer binder system.

In one embodiment, a primary polyurethane binder is incorporated into the support layer 30 in amounts of from about 4 to about 10 parts by weight based on 100 parts by weight of the primary pigment material. In one embodiment, the vinyl binder or vinyl chloride binder is incorporated into the support layer 30 in amounts from about 7 to about 15 parts by weight based on 100 parts by weight of the primary pigment material.

In one embodiment, the binder system of the support layer 30 further includes a head cleaning agent binder used to disperse the selected head cleaning agent material, such as a polyurethane binder in conjunction with a pre-dispersed or paste head cleaning agent. Alternatively, other head cleaning agent binders compatible with the selected head cleaning agent format (e.g., powder head cleaning agent) may be utilized.

The binder system may also contain a surface treatment agent. In one embodiment, the surface treatment agent is a known surface treatment agent, such as phenylphosphonic acid (PPA), 4-nitrobenzoic acid, and various other adducts of sulfuric, sulfonic, phosphoric, phosphonic, and carboxylic acids. In one embodiment, the binder system also contains a hardening agent or activator such as isocyanate and/or polyisocyanate. In one example, the hardening agent is incorporated into the support layer 30 in amounts of from about 2 to about 5 parts by weight based on 100 parts by weight of the primary support layer pigment.

In one embodiment, the support layer 30 further contains one or more lubricants such as a fatty acid and/or a fatty acid ester. The incorporated lubricant(s) exist throughout the magnetic side 14 and, importantly, at the recording surface 36 of the magnetic recording layer 32. The lubricant(s) reduces friction to maintain smooth contact with low drag, and protects the media surface from wear. Thus, in one example the lubricant(s) provided in both the support layer 30 and the magnetic recording layer 32 are selected and formulated in combination.

In one embodiment, the support layer 30 includes stearic acid that is at least 90% pure as the fatty acid and butyl stearate as a fatty acid ester. Although technical grade acids and/or acid esters can also be employed for the lubricant component, incorporation of high purity lubricant materials generally ensures robust performance of the resultant medium. Alternatively, other acceptable fatty acids include myristic acid, palmitic acid, oleic acid, etc., and their mixtures. The formulation of the support layer 30 can further include a fatty acid ester such as butyl stearate, isopropyl stearate, butyl oleate, butyl palmitate, butylmyristate, hexadecyl stearate, and oleyl oleate. The fatty acids and fatty acid esters may be employed singly or in combination. In one embodiment, the lubricant is incorporated into the support layer 30 in an amount of from about 1 to about 10 parts by weight, and preferably from about 1 to about 5 parts by weight, based on 100 parts by weight of the primary pigment material.

In one embodiment, solvents are mixed with or otherwise associated with the support layer 30 to form the coating material of the support layer 30. In one example, the solvents include cyclohexanone (CHO) with a concentration in the range of about 5% and about 50%, methyl ethyl ketone (MEK) with a concentration in the range of about 30% and about 90%, and toluene (Tol) with a concentration in the range of about 0% and about 40%. Alternatively, other solvents or solvent combinations including, for example, xylene, tetrahydrofuran, methyl isobutyl ketone, and methyl amyl ketone, are associated with the coating material of the support layer 30.

The materials for the support layer 30 are mixed with the surface treated primary pigment, and the support layer 30 is coated onto the substrate 12. In one embodiment, the resultant support layer 30 has a thickness of between about 32 microinches (0.81 μm) to about 50 microinches (1.27 μm).

The Magnetic Recording Layer

In one embodiment, the magnetic recording layer 32 includes a dispersion of magnetic pigments, an abrasive or head cleaning agent (HCA), a binder system, one or more lubricants, and/or a conventional surfactant or wetting agent. The components of the magnetic recording layer 32 are combined to form magnetic recording layer 32 with the desired properties. In one embodiment, the volume concentration of the magnetic pigments in the magnetic recording layer is greater than about 35%, preferably, greater than about 40%.

The magnetic pigments have a composition including, but not limited to, metallic iron and/or alloys of iron with cobalt and/or nickel, and magnetic or non-magnetic oxides of iron, other elements, or mixtures thereof, which will hereinafter be referred to as metal particles. Alternatively, the metal particles can be composed of hexagonal ferrites such as barium ferrites.

In one embodiment, the metal particles have an average long axis length of less than about 60 nm, preferably less than about 50 nm. In one embodiment, the average length of the metal particles utilized in the magnetic recording layer 32 are less than or equal to about 45 nm.

"Coercivity" and "magnetic coercivity" are synonymous, are abbreviated Hc, and refer to the intensity of the magnetic field needed to reduce the magnetization of a ferromagnetic material (in this case the magnetic recording layer 32) to zero after the material has reached magnetic saturation. Use of metal particles with relatively high coercivity with a high volume of concentration within the magnetic recording layer 32 causes the magnetic recording tape 10 to exhibit a significantly narrowed pulsewidth, when measured by recording a signal on the magnetic recording tape 10 at a sufficiently low density that the transitions are isolated from one another (i.e., they do not interact or interfere with one another). In one embodiment, the magnetic pigment utilized in the magnetic recording medium has a coercivity greater than about 183 kA/m (2300 Oe).

In order to improve the required characteristics, the preferred magnetic pigments may contain various additives, such as semi-metal or non-metal elements and their salts or oxides, such as Al, Co, Y, Ca, Mg, Mn, Na, and other suitable additives. The selected magnetic pigment may be treated with various auxiliary agents before it is dispersed in the binder system.

The head cleaning agent may be added to the magnetic recording layer 32 dispersion separately or may be dispersed within a binder system prior to addition to the magnetic recording layer 32 dispersion. In one embodiment, the head cleaning agent is aluminum oxide. Other abrasive grains, such as silica, $ZrO_2$, $CrO_3$, etc., can also be employed either alone or in mixtures with aluminum oxide or each other to form the head cleaning agent.

In one embodiment, the head cleaning agent is added in a manner configured to increase the surface presentation of the head cleaning agent throughout the life of the magnetic recording tape 10. However, a simple increase in the amount of head cleaning agent included in the magnetic recording layer 32 dispersion has been found to decrease the magnetic particle concentration in the magnetic recording layer 32, thereby, concomitantly decreasing the magnetic recording properties of the magnetic recording tape 10, which, for most examples, is generally undesirable in high density recording applications. In one embodiment, the mean particle size of the head cleaning agent is decreased. In one example, a head cleaning agent is used having a mean particle size of not greater than 90 nm. In one embodiment, in addition to decreasing the mean particle size of the head cleaning agent, the volume concentration of the head cleaning agent is provided at a level of at least 6.5%, more preferably, of at least 7%.

Providing a head cleaning agent with a decreased mean particle size and increased volume concentration as described above has proven to maintain abrasivity of the magnetic recording tape 10 over the lifespan of the magnetic recording tape 10 as opposed to other media in which larger head cleaning agent particles are used. One such example is illustrated in the Example section below. Abrasivity is the tendency of the magnetic recording tape 10 to wear the components in the tape transport, drive, or in the cartridge including the tape. The abrasivity is quantified by the amount of material removed from a 90° corner of an Alfesil wear bar due to the tape's magnetic side 14 passing over the wear bar corner. In one example, providing the head cleaning agent with a decreased mean particle size and increased volume concentration as described above provides a magnetic recording layer having a less than 50% drop in abrasivity following long length durability (LLD) cycling. LLD is defined herein as 4800 full length passes of the magnetic recording tape 10 through the T10000 tape drive. The benefits associated with the smaller mean particle size of the head cleaning agent are further increased when used in combination with the calendering methods further described below.

The binder system of the magnetic recording layer 32 incorporates at least one binder resin, such as a thermoplastic resin, in conjunction with other resin components, such as binders and surfactants used to disperse the head cleaning agent, a surfactant or wetting agent, and one or more hardeners. In one embodiment, the binder system of the magnetic recording layer 32 includes a combination of a primary polyurethane resin and a vinyl resin. Examples of polyurethanes include polyester-polyurethane, polyether-polyurethane, polycarbonate-polyurethane, polyester-polycarbonate-polyurethane, and polycaprolactone-polyurethane. The vinyl resin is frequently a vinyl chloride resin, a vinyl chloride-vinyl acetate copolymer, vinyl chloride-vinyl acetate-vinyl alcohol copolymer, vinyl chloride-vinyl acetate-maleic anhydride and the like. Resins such as bis-phenyl-A epoxide, styrene-acrylonitrile, and nitrocellulose may also be acceptable in certain magnetic recording medium formulations.

In an alternate embodiment, the vinyl resin is a non-halogenated vinyl copolymer. Useful vinyl copolymers include copolymers of monomers comprising (meth)acrylonitrile; a nonhalogenated, hydroxyl functional vinyl monomer; a nonhalogenated vinyl monomer bearing a dispersing group, and one or more nonhalogenated nondispersing vinyl monomers. In one embodiment, the nonhalogenated vinyl copolymer is a copolymer of monomers comprising 5 to 40 parts by weight of methacrylonitrile, 30 to 80 parts by weight of one or more nonhalogenated, nondispersing, vinyl monomers, 5 to 30 parts by weight of a nonhalogenated hydroxyl function, vinyl monomer, and 0.25 to 10 parts by weight of a nonhalogenated vinyl monomer bearing a dispersing group.

In one embodiment, the primary polyurethane binder is incorporated into the magnetic recording layer 32 in an amount of about 4 to about 10 parts by weight based on 100 parts by weight of the magnetic pigment, and the vinyl or vinyl chloride binder is incorporated in an amount of from about 8 to about 20 parts by weight based on 100 parts by weight of the magnetic pigment.

In one example, the binder system further includes a head cleaning agent binder used to disperse the selected head cleaning agent material, such as a polyurethane binder in conjunction with a pre-dispersed or paste head cleaning agent. Use of other head cleaning agent binders compatible with the format of the selected head cleaning agent (e.g., powder head cleaning agent) is also contemplated.

In one embodiment, the magnetic recording layer 32 includes one or more lubricants such as a fatty acid and/or a fatty acid ester. The incorporated lubricant(s) exist throughout the magnetic side 14 including at the recording surface 36 of the magnetic recording layer 32. In general, the lubricant(s) reduce friction to maintain smooth contact with low drag and at least partially protects the recording surface 36 from wear. Thus, the lubricant(s) provided in both the magnetic recording layer 32 and the support layer 30 are selected and formulated in combination.

In one embodiment, fatty acid lubricants include stearic acid that is at least about 90% pure and/or butyl palmitate. Although technical grade acids and/or acid esters can also be employed for the lubricant component, incorporation of high purity lubricant materials ensures robust performance of the resultant medium. Other examples of acceptable fatty acids include myristic acid, palmitic acid, oleic acid, etc., and their mixtures. The upper layer formulation can further include a fatty acid ester such as butyl stearate, isopropyl stearate, butyl oleate, butyl palmitate, butylmyristate, hexadecyl stearate, and oleyl oleate. The fatty acids and fatty acid esters may be employed singly or in combination. In one embodiment, lubricants are incorporated into the magnetic recording layer 32 in an amount from about 1 to about 10 parts by weight based on 100 parts by weight of the magnetic pigment.

The conventional surfactant or wetting agent may be added separately to a magnetic recording layer dispersion including one or more of the above-identified components or added to the binder system prior to being added to the magnetic recording layer dispersion. In one embodiment, known surfactants, such as phenylphosphonic acid (PPA), 4-nitrobenzoic acid, and various other adducts of sulfuric, sulfonic, phosphoric, phosphonic, and carboxylic acids are utilized. In one embodiment, the binder system contains a hardening agent or activator such as isocyanate, and/or polyisocyanate. In one example, the hardener component is incorporated into the magnetic recording layer 32 in an amount of from about 2 to about 6 parts by weight based on 100 parts by weight of the magnetic pigment.

The materials for the magnetic recording layer 32 are mixed together to form the magnetic recording layer dispersion. The magnetic recording layer dispersion is coated onto the top surface 34 of the support layer 30 to form the magnetic recording layer 32. In one embodiment, solvents are added to the magnetic recording layer dispersion prior to coating the support layer 30 with the magnetic recording layer 32. For example, solvents associated with the magnetic recording layer 32 include cyclohexanone (CHO) with a concentration in the range of about 5% about 50%, methyl ethyl ketone (MEK) with a concentration in the range of about 30% to about 90%, and toluene (Tol) with a concentration in the range of about 0% and about 40%. Other solvents or solvent combinations including, for example, xylene, tetrahydrofuran, methyl isobutyl ketone, and methyl amyl ketone, may also be utilized.

In one embodiment, the coated and processed magnetic recording layer 32 has a final thickness from about 2 microinches (0.05 µm) to about 5 microinches (0.125 µm), more preferably, from about 3 microinches (0.75 µm) to about 5 microinches (0.125 µm). In one embodiment, the magnetic recording layer 32 is formed to have a remanent magnetization-thickness product (Mr*t) of less than about 2.5 memu/cm$^2$, preferably less than about 2.2 memu/cm$^2$. The term "remanent magnetization thickness product" refers to the product of the remanent magnetization after saturation in a strong magnetic field (796 kA/m) multiplied by the thickness of the magnetic coating.

"Orientation Ratio" refers to the ratio of remanent magnetization at zero applied magnetic field after saturation in a strong magnetic field (796 kA/m) measured in the direction parallel to that of the recording medium's intended transport to the corresponding quantity measured in the direction transverse (i.e., perpendicular, but in the plane of the magnetic recording medium) to that of the intended transport of the magnetic recording medium. In one embodiment, the fully processed magnetic recording layer 32 has an orientation ratio of greater than 2.2, preferably greater than 2.4. In one example, the magnetic recording layer 32 has an orientation ratio of greater than 2.6.

The Backside

In one embodiment, the backcoat or backside 16 primarily consists of a soft (i.e., Moh's hardness <5) non-magnetic particle material such as carbon black or silicon dioxide particles. In one embodiment, the backside 16 comprises a combination of two kinds of carbon blacks, including a primary, small carbon black component and a secondary, large texture carbon black component, in combination with appropriate binder resins.

As is known in the art, pigments of the backside 16 dispersed as inks with appropriate binders, surfactant, ancillary particles, and solvents are typically purchased from a designated supplier. In a preferred embodiment, the backside binder includes at least one of the following: a polyurethane polymer, a phenoxy resin, or nitrocellulose added in an amount appropriate to modify coating stiffness as desired. The backside 16 is coated onto the bottom surface 20 of the substrate 12 to increase the durability of the magnetic recording tape 10. In one embodiment, the backside is coated to have a thickness between about 23 microinches (0.58 µm) and about 28 microinches (0.71 µm).

Figure 2:
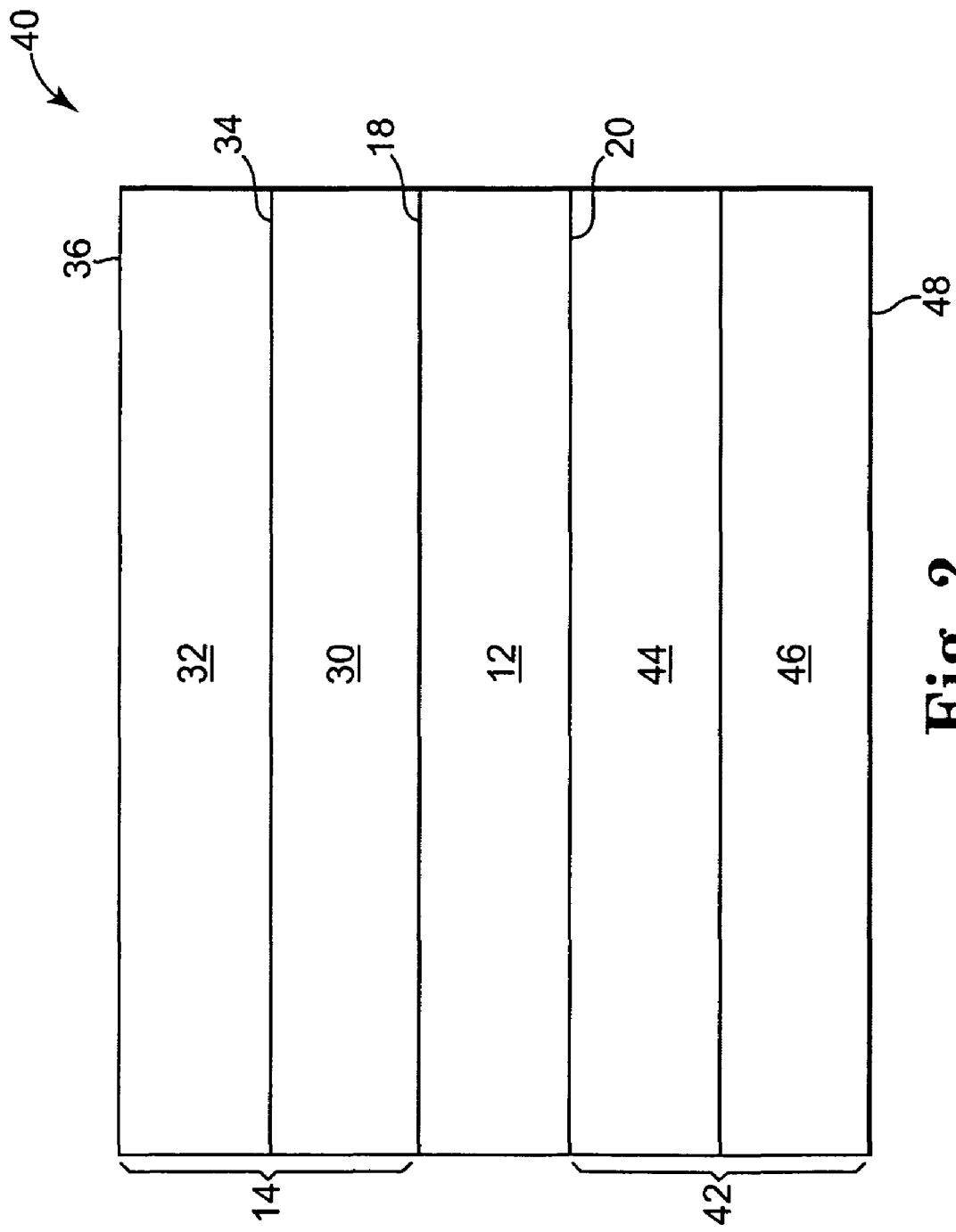
FIG. 2 is a schematic illustration of a cross-sectional view of one embodiment of a magnetic recording medium.

In one embodiment, as illustrated with reference to FIG. 2, backside 16 as described above is alternatively replaced with a second magnetic side 42 to form a magnetic recording tape 40, which, except for those differences specifically enumerated herein, is substantially similar to the magnetic recording tape 10. The second magnetic side 42 is similar to the first magnetic side 14, but is coated over the bottom surface 20 of the substrate. More specifically, a second support layer 44, which is similar to the support layer 30, extends over the bottom surface 20 of the substrate 12. A second magnetic recording layer 46, which is similar to the magnetic recording layer 32, extends over the second support layer 44 opposite the substrate 12. As such, the second magnetic recording layer 46 defines a second recording surface 48 opposite the first recording surface 36. Although the remainder of this description refers to magnetic recording tape 10 with a single magnetic side 14, it should be understood that such description also translates to use with the dual-magnetic side recording tape 40.

Manufacturing Process

For manufacturing, each of the components of the support layer 30 are combined in a manner described above to form a coating to be applied to the substrate 12. Similarly, each of the magnetic recording layer 32 and the backside 16 are also mixed to form the respective coating mixtures, which are subsequently coated on the upper surface 34 of the support layer 30 and the bottom surface 20 of the substrate 12, respectively, as will be further described below.

Figure 3:
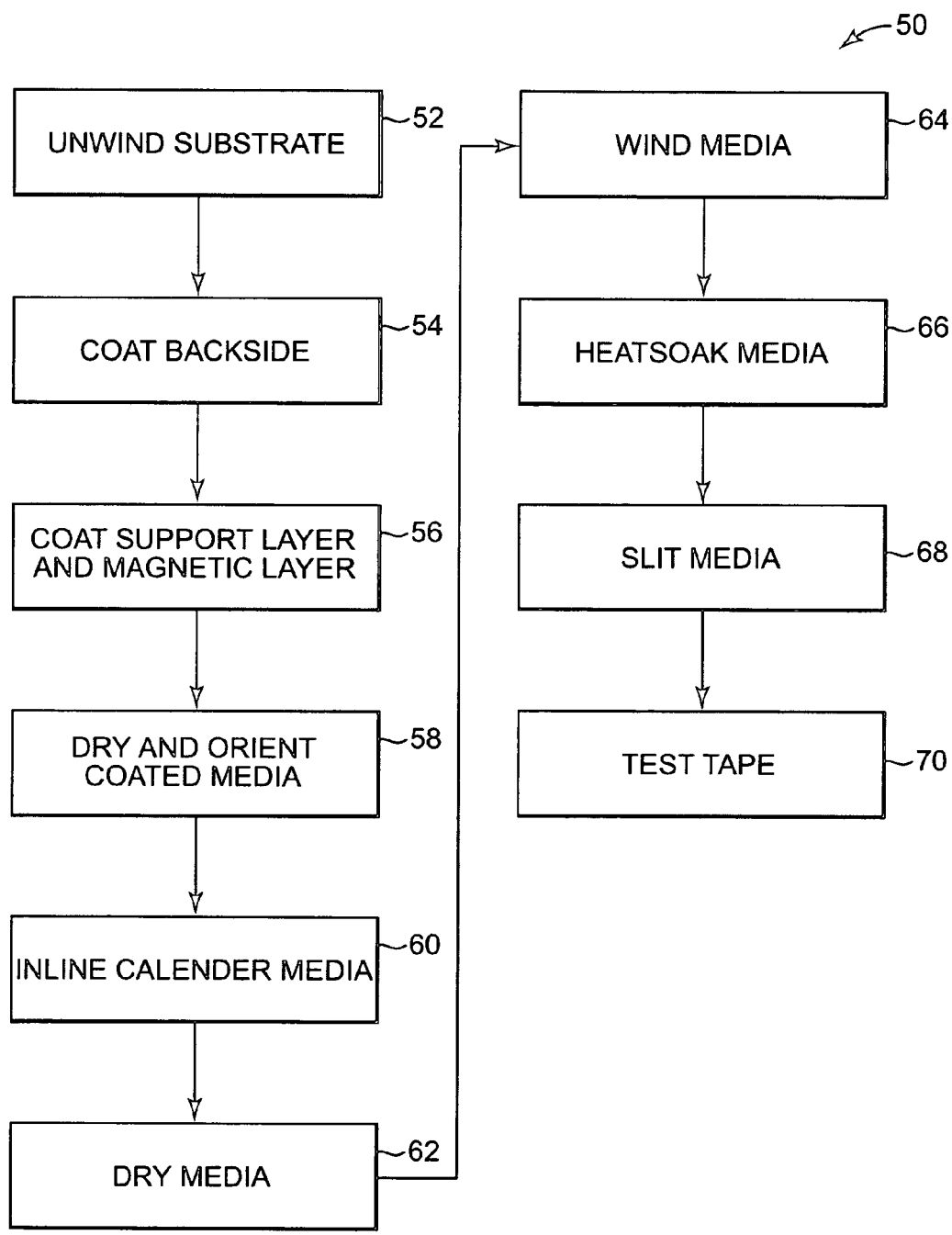
FIG. 3 is a flow chart of one embodiment of a method of manufacturing the magnetic recording medium of FIG. 1.

FIG. 3 is a flow chart generally illustrating one embodiment of a method for manufacturing a magnetic recording tape generally at 50 as described with respect to the magnetic recording tape 10 of FIG. 1. In one embodiment, the particular process for manufacturing of magnetic recording tape 10 includes an inline portion and one or more off-line portions. More specifically, at 52, the inline portion includes unwinding a sheet form of the substrate 12 or other material from a spool or supply roll. At 54, the substrate 12 is coated with the backside 16 material on the lower surface 20 of substrate 12. At 56, the magnetic side 14 is applied to the substrate 12. For the dual-layer magnetic side 14, the support layer 30 is first applied directly to the substrate 12 and the magnetic recording layer 32 is then coated over the support layer 30 in a wet-on-wet process. Alternatively, the magnetic side 14 can be applied to the substrate 12 prior to application of the backside 16 to the substrate 12. In one embodiment, the support layer 30, magnetic layer 32, and backside 16 are applied to substrate 12 or each other using wet-on-wet, wet-on-dry, dual-slot, sequential die, or another coating process.

Notably, in view of the above, a sheet 10' that will eventually be cut into, a plurality of magnetic recording tapes 10 is provided with the substrate, the magnetic side 14 opposite the backside 16 to have a similar cross-section as illustrated in FIG. 1 for the magnetic recording tape 10. Accordingly, manufacturing steps performed on the sheet 10' are effectively being performed on a plurality of magnetic recording tapes 10.

At 58, the sheet 10' is magnetically orientated and dried. More specifically, in one embodiment, the magnetic side 14 of sheet 10' is orientated by advancing the sheet 10' through one or more magnetic fields to generally align the magnetic orientation of the metal particles of the magnetic recording layer 32 to have an orientation ratio greater than about 2.2, preferably greater than about 2.4. This level of orientation of the magnetic particles generally increases the recording characteristics of the resultant magnetic recording tapes 10. In one example, each magnetic field is formed by electric coils and/or permanent magnets.

Figure 4:
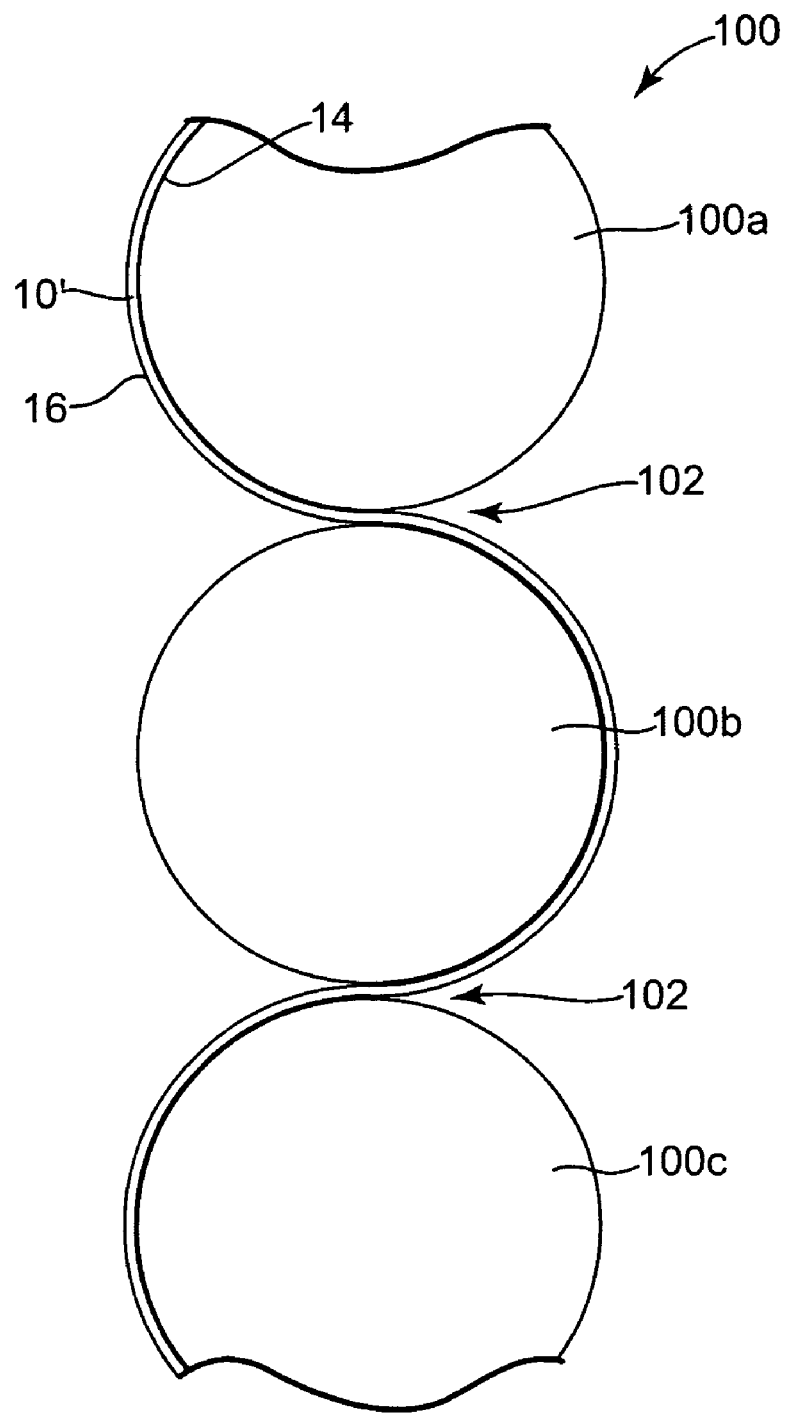
FIG. 4 is a schematic illustration of one embodiment of a calendar stack and a magnetic recording medium.

Following orientation and drying, the sheet 10' is inline calendered at 60. According to one embodiment, inline calendering at 60 includes steel-on-steel (SOS), inline calendering of the sheet 10'. As illustrated with additional reference to the plurality of rollers 100 (i.e. a calendering stack) of FIG. 4, SOS inline calendering uses two or more inline, steel rollers 100 which interact with each other to form a nip station 102 between each adjacent roller 100. The sheet 10' is advanced over the rotating rollers 100, and the rollers 100 are applied to the sheet 10' to compress the sheet 10'. At each nip station 102, a steel roller 100*a* contacts or otherwise is applied to the magnetic side 14 of the sheet 10' and the second steel roller 100*b*, which is adjacent the first steel roller 100*a*, contacts or otherwise is applied to an outer surface of the backside 16 of the sheet 10' opposite the substrate 12. As such, the sheet 10' is compressed between the adjacent rollers 100*a* and 100*b*.

In one embodiment, a nip pressure per linear inch of the sheet 10' is measured at each nip station 102 and is relatively low as compared to prior art nip pressures. In particular, in one embodiment, the nip pressure is less than about 2000 lb/in (350.2 N/mm), more preferably, less than about 1600 lb/in (280.2 N/mm) at each nip station 102. The low nip pressure serves to limit compression of the sheet 10', thereby, maintaining higher levels of porosity in the magnetic side 14 than exhibited with higher nip pressures. Higher levels of porosity result in more storage area for lubricants.

In addition, the lower nip pressures generally do not seal off the recording surface 36 from the lubricant such that lubricant stored in the pores of the magnetic side 14 can gradually work to the recording surface to replenish the lubricant initially available at the recording surface 36. Accordingly, the resultant magnetic recording tapes 10 remain sufficiently lubricated for longer periods of use, and thereby, the durability of the magnetic recording tape 10 is increased. Notably, although illustrated as three rollers 100, any number of rollers of two or greater may comprise the calendar stack.

In one embodiment, calendering further includes heating the rollers 100 to facilitate compression of the sheet 10'. In particular, each of rollers 100 is heated to a desired temperature based on which side 14 or 16 of the sheet 10' the particular roller 100 will contact. For example, referring to FIG. 4, a first roller 100*a* is configured to contact the magnetic side 14 of sheet 10', a second roller 100*b*, which is adjacent the first roller 100*a*, is configured to contact the backside 16, and a third roller 100*c*, which is adjacent the second roller 100*b* opposite the first roller 100*a*, is configured to contact the magnetic side 14. With this in mind, the first and third rollers 100*a* and 100*c* are considered magnetic side rollers, and the second roller 100*b* is considered a backside roller.

In one embodiment, the magnetic side rollers 100*a* and 100*c* are heated to a different temperature than the backside roller 100*b*. In one example, relatively low temperatures are used in heating one or both of the backside and magnetic side rollers 100*a*, 100*b*, and 100*c* as compared to conventional calendering processes. In one embodiment, the magnetic side rollers 100*a* and 100*c* are heated to a temperature of less than or equal to 175° F. (79.4° C.), more preferably, of less than or equal to 150° F. (65.6° C.). In one embodiment, the backside roller 100*b* is heated to a temperature of less than or equal to 160° F. (71.1° C.), more preferably, of less than or equal to 150° F. (65.6° C.). Low temperatures, especially with respect to the magnetic side rollers 100*a* and 100*c*, further limit compression and preserve porosity of the sheet 10'.

For example, the sheet 10' is calendered using relatively low nip pressures and/or relatively low roller temperatures to form the sheet 10', and thereby the resultant magnetic recording tapes 10, with increased levels of surface area and porosity. For instance, in one example, the resultant magnetic recording tapes 10 have an unextracted BET surface area of greater than 0.5 m$^2$/g, more preferably greater than 1.5 m$^2$/g. In one embodiment, the magnetic recording tapes 10 have an extracted BET surface area of greater than 1.0 m$^2$/g, more preferably, greater than 2.0 m$^2$/g, and even more preferably greater than 2.5 m$^2$/g. The extracted or unextracted characteristic refers to whether the properties were measured with the lubricant in the magnetic recording tape 10, which is unextracted, or with the lubricant removed by solvent extraction with hexane from the magnetic recording tape 10, which is extracted.

Alternatively or additionally, the inline calendering includes "compliant-on-steel" (COS) calendering in which both steel and compliant rolls are used. After inline calendering, the sheet 10 is further dried at 62. The dried magnetic recording sheet 10' is subsequently wound onto a take-up roll at 64. At 66, the wound sheet 10' is heat soaked at a temperature of about 122° F. (50° C.) or other suitable temperature. In one embodiment, the magnetic recording tape 10 is heat soaked at 66 for about 60 hours or for any other suitable time period.

Subsequently, at 68, the sheet 10' is cut into elongated strips to form the individual magnetic recording tapes 10. At 70, the magnetic recording tapes 10 are tested and/or packaged within cartridge for sale and use.

A magnetic recording medium according to the embodiments of the present invention provides for durable medium for use in high density applications such as for use with T10000, LTO3, LTO4, LTO5, and other high density drives. More specifically, the magnetic recording mediums described above provide for increased lubricant mobility leading to better interfacial lubrication of the magnetic recording medium and components along a tape path that interact with the magnetic recording medium (i.e., interaction between the magnetic recording medium and the magnetic head of an associated drive) while still supporting high net uncompressed recording densities of not less than 30 MB/in$^2$ utilizing linear densities of at least 200 kbpi. Increased lubrication concomitantly leads to increased durability and life span of the magnetic recording medium.

Although specific embodiments have been described herein for purposes of description of the preferred embodiment, it will be appreciated by those of ordinary skill in the art that a wide variety of alternate and/or equivalent implementations calculated to achieve the same purposes may be substituted for the specific embodiments described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

EXAMPLES

As described above, various formulations of magnetic recording media fall within the scope of the present invention. Specific examples of a magnetic recording media, more specifically, of magnetic recording tape, formed in accordance with the above-described embodiments is described in detail below. Comparative examples of prior art magnetic recording tape are also described.

Example 1

Example 1 is a T10000 magnetic recording tape formed with a thin PEN substrate, a magnetic side, and a backside. The PEN substrate has a thickness of between 177 and 205 microinches. The magnetic side is formed of dual-layer construction to include a support layer and a magnetic layer. The support layer includes a primary pigment, a surfactant, carbon black, a head cleaning agent, binders, lubricants, and an activator mixed in the following amounts expressed in parts by weight per 100 parts of the primary pigment:

The primary pigment includes 100 parts α-iron oxide (e.g., PB-65 available from Today Kogyo Corp. of Hiroshima, Japan);
The surfactant includes 1.5 parts phenylphosphinic acid;
The carbon black includes 5.5 parts of Ketjenblack EC-600JD (available from Akzo Nobel of the Netherlands);
The head cleaning agent includes 5 parts aluminum oxide (e.g., HIT60A available from Sumitomo Chemical Co. of Japan);
The binders include 8.31 parts of a primary polyurethane resin (e.g., UR4125 available from Toyobo of Japan) and 11.07 parts of a vinyl chloride copolymer (e.g., MR-104 available from Nippon Zeon Co. Ltd. of Tokyo, Japan);
The lubricants includes 2 parts butyl stearate and 3 parts stearic acid; and
The activator includes 3.6 parts of a 55 weight percent solution of polyisocyanate in methylethylketone (e.g., Mondur® CB55N available from Bayer Corporation of Pittsburgh, Pa.).

The magnetic layer is coated over the support layer in a wet-on-wet processing technique. The magnetic layer includes a primary pigment, a surfactant, carbon black, a head cleaning agent, binders, lubricants, and an activator mixed in the following amounts expressed in parts by weight per 100 parts of the primary pigment:

The primary pigment includes 100 parts of ferromagnetic metal particles (e.g., NF-406 available from Toda Kogyo Corp.);
The surfactant includes 3.0 parts phenylphosphinic acid;
The carbon black includes 0.5 parts of a rubber carbon black (e.g., Sevacarb MT available from Columbian Chemical of Marietta, Ga.) and 0.5 parts of a carbon black having a mean particle size of 101 nm (e.g., Raven 410 available from Columbian Chemical);
The head cleaning agent includes 11.9 parts aluminum oxide (e.g., HIT70A available from Sumitomo Chemical Co.);
The binders include 4.36 parts of a primary polyurethane resin (e.g., UR4125 available from Toyobo) and 10.24 parts of a vinyl chloride copolymer (e.g., MR-104 available from Nippon Zeon Co. Ltd.);
The lubricants include 1 part butyl palmitate and 1 part stearic acid; and
The activator includes 3.06 parts of a 55 weight percent solution of polyisocyanate in methylethylketone (e.g., Mondur® CB55N available from Bayer Corporation).

The support layer is coated over the substrate with a thickness of 32 microinches (0.81 μm) to 50 microinches (1.27 μm), and the magnetic layer is wet-on-wet coated over the support layer with a thickness of 3 microinches (0.075 μm) to 5 microinches (0.125 μm). The resulting magnetic recording tape is processed as described above including calendering at the relatively low temperatures and low pressure as listed in Table 1 below.

TABLE 1

| | Calender Conditions | | |
| --- | --- | --- | --- |
| Example | Magnetic Side Calendering Temperature (° F.) | Back Side Calendering Temperature (° F.) | Calendering Pressure (pli) |
| 1 | 150 | 150 | 1555 |
| 2 | 200 | 160 | 1555 |
| C1 | 200 | 160 | 2670 |

Example 2

The magnetic recording tape of Example 2 is prepared from dispersions having similar compositions and coated using similar techniques as described above for Example 1. However, the magnetic recording tape of Example 2 was calendered with low pressure, but with higher temperatures as indicated in Table 1 above.

Comparative Example C1

The magnetic recording tape of Comparative Example C1 is prepared from dispersions having similar compositions and coated using similar techniques as described above for Example 1. However, the magnetic recording tape of Comparative Example C1 was calendered using the conventional high pressure and high temperatures indicated in Table 1 above.

Test Results

The magnetic recording tapes of Examples 1 and 2 and Comparative Example C1 were tested for the following parameters: lubricant levels determined by hexane extraction, lubricant levels determined by a wiped method, the extracted and unextracted BET surface area, the extracted and unextracted pore volume, the broadband signal-to-noise ratio (BBSNR), and the skirt signal-to-noise ratio (SkSNR). The testing results are included in Tables 2 and 3 below.

TABLE 2

Test Results

| Example | Hexane Extraction Stearic Acid (µg/36 in$^2$) | Hexane Extraction Butyl Palmitate (µg/36 in$^2$) | Hexane Extraction Butyl Stearate (µg/36 in$^2$) | Wiped Butyl Palmitate (mg/48 ft) | Wiped Butyl Stearate (mg/48 ft) |
|---|---|---|---|---|---|
| 1 | 1.31 | 0.09 | 1.49 | 0.034 | 0.516 |
| 2 | 1.23 | 0.09 | 1.46 | 0.012 | 0.199 |
| C1 | 1.43 | 0.09 | 1.53 | 0.000 | 0.076 |

TABLE 3

Additional Test Results

| Example | BET Surface Area (m$^2$/g) Unextracted | BET Surface Area (m$^2$/g) Extracted | Pore Volume (cc/g) Unextracted | Pore Volume (cc/g) Extracted | BBSNR (dB) | SkSNR (dB) |
|---|---|---|---|---|---|---|
| 1 | 2.122 | 3.191 | 0.011 | 0.013 | 18.0 | 23.0 |
| 2 | 1.635 | 2.503 | 0.009 | 0.012 | 17.0 | 23.4 |
| C1 | 0.315 | 0.820 | 0.001 | 0.003 | 18.3 | 23.8 |

The hexane extraction tests are performed by placing sample lengths of the magnetic recording tape in vials with a hexane solution to extract the lubricant from the magnetic recording tape. A sample of the resultant liquid is analyzed using a gas chromatography system to determine the quantities of various lubricant components, i.e., stearic acid, butyl palmitate, and butyl stearate, within the liquid. In this manner, the total amount of each lubricant component in the magnetic recording tape can be determined.

In view of the above, the results of performing hexane extraction on Example 1 and on Comparative Example C1, which are shown in Table 2, indicate little difference in the overall amount of lubricant included in each sample. The overall similarities are a function of the similar composition of each sample as described above.

The wiped values for butyl palmitate and butyl stearate tests were performed by passing a 1-inch by 1-inch toluene-saturated wipe, such as paper towel or other wipe that will not effect readings of a gas chromatography system, across a 48 foot length of a recording surface of the magnetic recording tape. More particularly, prior to wiping the magnetic recording tape, the wipe is saturated in toluene, the wipe is placed on top of the magnetic recording tape, which is positioned to be supported by a metal bar, and pressure is applied by hand to the wipe. While continuing to apply pressure to the wipe, the magnetic recording tape is pulled quickly across the metal bar for 48 feet, thereby, wiping the wipe over the surface of the magnetic recording tape. The used wipe is placed in a vial and the "wiping" described above is repeated 16 times placing each of the 16 wipes into the same vial.

Subsequently, 20 ml of solvent is placed in the vial, which is placed in a shaker with a Pierce heating block set for 110° C. for 1.5 hours. The vial is removed from the heater and is cooled at room temperature for about 0.5 hour. The sample is then analyzed using a gas chromatography system for the amount of butyl palmitate and/or butyl stearate in the sample. The total amount of each component is indicated in Table 2.

The results of the wiped test method described above provide data for comparison of the amount of lubricant present at the recording surface of the magnetic recording tape. This method has been found to more accurately represent the amount of surface lubricant on the magnetic recording tape than other known methods of dissolving nearly all the lubricant in the magnetic recording tape such as the hexane extraction test, which, as described above, indicates total levels of lubricant throughout the entire magnetic recording tape rather than at the surface. Since during use of the magnetic recording tape the lubrication at the recording surface is of primary importance, this method accurately illustrates the presence of lubrication at that surface.

For instance, as indicated in Table 1, despite inclusion of similar amounts of total lubricant (as described above with respect to the hexane extraction test), Examples 1 and 2 show higher levels of lubricant available at the recording surface as compared to Comparative Example C1. More specifically, the low pressure calendering of Example 2 more than doubled the amount of lubricant available at the recording surface. In addition, calendering using both low pressure and low temperature as performed in Example 1, led to more than five times the amount of lubricant provided at the recording surface as compared with Comparative Example C1. Since, as described above, the amount of lubricant at the surface more directly corresponds with the lubricant available to ease interaction between the magnetic recording tape with the tape drive or cartridge components, the increase in surface lubricant indicates decreased interfacial stresses in the magnetic recording tape, and thereby, will cause an increased durability of the magnetic recording tape.

The BET surface area (i.e., the surface area calculated using the Brunauer, Emmett, and Teller method) and pore volume tests were performed using methods known in the art. The designations of "unextracted" and "extracted" relate to the lubricant of the magnetic recording tape. When noted as being an unextracted test result, the magnetic recording tape was tested with the lubricants in place. When noted as being an extracted test result, the magnetic recording tape was tested after removal of the lubricants from the magnetic recording tape by hexane extraction.

More specifically, the BET surface area test calculates the surface area of solids by physical adsorption of gas molecules. The magnetic recording tape being tested is placed in a chamber and evacuated. Gas molecules, in this case nitrogen molecules, that stick to the surface of the magnetic side (i.e., adsorbent) are added admitted to the evacuated chamber. The gas molecules are said to be adsorbed and tend to form a thin layer that covers the entire adsorbent surface. Notably, the gas molecules stick to the backside as well, but since there is little to no porosity in the backside, such effects are generally negligible.

The number of molecules required to cover the adsorbent surface with a monolayer of adsorbed molecules can be estimated, and the surface area calculated using the BET theory. In particular, the specific surface area S, which is indicated in Table 3, is evaluated by using the following equation:

$$S = \frac{v_m N \sigma}{m v_o}$$

where:

$v_m$=the monolayer adsorbed gas quantity;

$v_o$=the molar volume of the absorbing gas;

N=Avagadro's number;

σ=the area of surface occupied by a single gas molecule; and m=the mass of the absorbing sample.

The BET surface area test results indicate the increased surface area due to an increase in pore area that is in communication with the recording surface of the magnetic recording tapes of Example 1 as compared to Comparative Example 1. More specifically, Example 1 is shown to have more than three times the BET surface area as Comparative Example C1 when extracted. This increased value translated to more storage for lubricant that can subsequently reach the recording surface of the magnetic recording tape during use. Even with lubricant in place in each magnetic recording tape (i.e., unextracted), Example 1 is shown to maintain a higher BET surface area than Comparative Example C1.

Pore volume, which indicates available volume for storing the lubricants, as indicated in Table 3 was analyzed by continuing the addition of gas beyond the monolayer formation discussed above for BET analysis until the equilibrium adsorbate pressures approach saturation thereby filling the pores with adsorbate. The cumulative volume of gas adsorbed by the magnetic recording tape is measured and the volume is calculated using the density of the adsorbate. In particular, the pore volume is calculated for pores between 17 Angstroms and 3000 Angstroms in diameter. The pore volumes of Table 3 indicate Example 1 to be much improved over Comparative Example C1. In particular, the extracted pore volume of Example 1 is over four times the extracted pore volume of Comparative Example C1, which once again indicates a larger volume of available storage for the lubricants. As described above, more pore volume for lubricants generally leads to increased durability of the magnetic recording tape.

This link between surface lubrication and durability is illustrated with additional reference to the graphs of FIGS. 5 and 6. In particular, Example 1 and Comparative Example C1 were tested for durability by completing at least 100 full file writes with a T10000 tape drive on each magnetic recording tape and plotting the number of full file writes against a corresponding measured, arithmetic block error rate. Each full file write includes 24 passes of the magnetic recording tape through the T10000 tape drive. The results for Comparative Example C1 and Example 1 are generally illustrated in the graphs of FIGS. 5 and 6, respectively. In each graph, line 82 indicates the arithmetic block error rate calculated to result in permanent errors of the magnetic recording tape. As such, failure of the magnetic recording tape occurs when the arithmetic block error rate of the magnetic recording tape crosses the threshold indicated by line 82.

Referring to the plot line generally indicated at 80 of FIG. 5, Comparative Example C1 can be seen to exhibit failure just after thirty full file writes. Conversely, as illustrated by the plot line 84 of FIG. 6, Example 1 does not exhibit failure at any point during the one hundred full file writes performed. Rather, Example 1 exhibits a sustained, relatively low level of arithmetic block error rate. In view of the above, Example 1 exhibits a life span of more than three times the number of full file writes as compared to Comparative Example C1. Accordingly, Example 1 is superior in terms of durability in comparison to Comparative Example C1.

Once again referring to Table 3, Skirt Signal-to-Noise Ratio, or "SkSNR," is a measure of the modulation noise when observing noise sources at frequencies close to the fundamental write frequency of the magnetic recording medium. SkSNR is typically measured by comparing the peak signal power and the integrated noise power within 102 megahertz of the fundamental write frequency of the magnetic recording medium. One example method of measuring SkSNR is described in ECMA International Standard 319.

Broadband Signal-to-Signal Noise Ratio, or "BBSNR," is the ratio of the average signal power to the average integrated broadband noise power of a magnetic recording medium clearly written at the test recording density. BBSNR specifically measures the area under the frequency curve from 4.5 kHz to 15.8 kHz. One example method of measuring BBSNR is described in ECMA International Standard 319.

As noted in Table 3, the SkSNR and the BBSNR values for Examples 1 and 2 are only slightly lower than the values for Comparative Example C1. In this manner, only a small amount of performance in terms of SkSNR and BBSNR is given up to receive a disproportionate increase in durability of the magnetic recording tapes as described above with respect to FIGS. 5 and 6.

Examples 3 and 4

Example 3 is formed of a similar composition using similar processes as described above with respect to Example 1. However, Example 3 includes a head cleaning agent (HCA) with a mean particle size of 0.008 μm and with a volume concentration of 6.5 percent of the magnetic layer dispersion.

Example 4 is substantially identical to Example 3, except Example 4 includes a HCA with a mean particle size of 90 nm and having a volume concentration of 7.3 percent of the magnetic layer dispersion as indicated in Table 4.

TABLE 4

| | | | | Abrasivity | | |
|---|---|---|---|---|---|---|
| Example | HCA | Volume Conc. | Primary Particle Size* (nm) | Initial Abrasivity (μm) | Abrasivity After LLD Cycling (μm) | % Drop in Abrasivity |
| 3 | HIT70A | 6.5 | 90 | 10.36 | 7.96 | 23 |
| 4 | HIT70A | 7.3 | 90 | 12.59 | 12.00 | 5 |
| C2 | HIT60A | 4.5 | 130 | 14.15 | 5.97 | 63 |
| C3 | HIT60A | 6.4 | 130 | 15.69 | 6.09 | 61 |

*Primary particle size calculated according to d = [6/(BET Surface Area × Density)]

Comparative Examples C2 and C3

Comparative Examples C2 ad C3 are substantially identical to Example 3 except as specifically noted. Comparative Examples C2 and C3 use a larger particle size HCA, more specifically, a mean particle sized of 0.010 nm, as indicated in Table 4. Comparative Examples C2 and C3 include the HCA having a volume concentration of 4.5 and 6.4 percent, respectively.

Abrasivity Test Results

Each of Examples 3 and 4 and Comparative Examples C2 and C3 were analyzed for abrasivity before and after long length durability (LLD) cycling. As described above, abrasivity is quantified by the amount of material removed from a 90° corner of an Alfesil wear bar due to passing the magnetic recording tape over the wear bar edge. In one example and as used to arrive at the values of Table 4, the material composition of the Alfesil wear bar is 5.4% weight aluminum, 9.6% weight silicon, and the balance is iron. Alternatively, a ferrite wear bar can be used including 82% nickel and 18% iron. The angle of the test edge shall be 90° with a radius of less than or equal to 1.4 μm. The tape wrap angle of the bar is 8° on each side to form a total wrap angle of 16°. Using either a new magnetic recording tape or a magnetic recording tape after LLD cycling, the wear pattern is measured after three forward passes (all on the same magnetic recording tape) on a 520 nm length of the magnetic recording tape at a speed of 1.0 m/s with a tape tension of 1.4 N (143 gf, 43 ozf). The measurement is an average of three measurements taken across the 3.16 mm, 6.3 mm, and 9.5 mm points of the 12.65 mm width of the wear pattern.

As indicated in Table 4, although Comparative Examples C1 and C2 have higher initial abrasivity values, following continued use or LLD passes, Examples 3 and 4, which utilize smaller mean particle size HCA, exhibit a drastic decrease in the percent drop of abrasivity. The drop is especially of notice when comparing Example 3 with Comparative Example C3 as both include similar volume concentrations of HCA and where the drop in abrasivity of Example 3 is nearly one-third less than that for Comparative Example C3. Sustained abrasivity as provided in Examples 3 and 4 provides for a more sustained cleaning of associated tape guides and drive members, such as the read/write head. The sustained cleaning additionally contributes to increased durability and life span of the associated magnetic recording tapes.

What is claimed is:

1. A magnetic recording tape comprising:
an elongated substrate; and
a magnetic side consisting of:
a support layer formed over the substrate; and
a magnetic recording layer formed over the support layer to define a magnetic recording surface opposite the substrate, the magnetic recording layer consisting of magnetic particles and a lubricant, the magnetic recording layer supporting a net uncompressed density of at least 30 MB/in$^2$;
wherein the magnetic side has an extracted BET surface area of greater than 1.0 m$^2$/g, wherein the extracted BET surface area is calculated using Brunauer, Emmett and Tiller method for physical adsorption of gas molecules on a solid surface, where the extracted BET surface area is measured after the lubricant has been removed from the magnetic recording layer using solvent extraction.

2. The magnetic recording tape of claim 1, wherein the extracted BET surface area is greater than 2.0 m$^2$/g.

3. The magnetic recording tape of claim 1, wherein the magnetic recording surface defines an unextracted BET surface area of greater than 0.5 m$^2$/g, wherein the unextracted BET surface area is calculated using Brunauer, Emmett and Tiller method for physical adsorption of gas molecules on a solid surface, where the unextracted BET surface area is measured before the lubricant has been removed from the magnetic recording layer using solvent extraction.

4. The magnetic recording tape of claim 1, wherein the magnetic recording layer has a remanent magnetization-thickness product (Mr*t) of less than about 2.5 memu/cm$^2$.

5. The magnetic recording tape of claim 1, wherein the magnetic particles of the magnetic recording layer have an orientation ratio of greater than 2.2.

6. The magnetic recording tape of claim 1, wherein the magnetic particles have a particle length of less than 60 nm and a volume concentration of greater than 35%.

7. The magnetic recording tape of claim 1, wherein the magnetic side has a resistivity of less than $1 \times 10^8$ ohms/square.

8. The magnetic recording tape of claim 1, wherein the support layer includes α-iron oxide as a primary pigment, which has a particle length less than 150 nm and a volume concentration in the support layer of greater than 35%, and carbon black in an amount of between 4 and 10 parts by weight of the α-iron oxide.

9. The magnetic recording tape of claim 1, wherein the abrasivity drop of the magnetic recording medium is less than 50% following long length durability (LLD) cycling, wherein the abrasivity drop is an amount of material removed from a 90° corner of an Alfesil wear bar due to the magnetic recording medium passing over the wear bar corner and wherein LLD cycling is 4,800 full length passes of the magnetic recording tape through a T10000 tape drive.

10. The magnetic recording tape of claim 1, wherein the elongated substrate has a width of about 0.5 inches, the magnetic particles of the magnetic recording layer have a particle length of less than 50 nm, a volume concentration of greater than 40%, and an orientation ratio of greater than 2.4, the magnetic recording layer has a remanent magnetization-thickness product (Mr*t) of less than about 2.2 memu/cm$^2$ and a coercivity of greater than 183 kA/m (2300 Oe), and the magnetic side has a resistivity of less than $5 \times 10^7$ ohms/square.

11. A magnetic recording tape comprising:
a substrate having a width of about 0.5 inches; and
a magnetic side formed over the substrate, the magnetic side having a resistivity of less than $1 \times 10^8$ ohms/square and supporting a net uncompressed density of at least 30 MB/in$^2$ utilizing a linear density of at least 200 kbpi, and the magnetic side consisting of:
a support layer formed over the substrate; and
a magnetic recording layer consisting of magnetic particles and a lubricant, the magnetic layer being formed over the support layer to define a magnetic recording surface opposite the substrate, and the magnetic side having an extracted BET surface area of greater than 1.0 m²/g, wherein the extracted BET surface area is calculated using Brunauer, Emmett and Tiller method for physical adsorption of gas molecules on a solid surface, where the extracted BET surface area is measured after the lubricant has been removed from the magnetic recording layer using solvent extraction.

12. The magnetic recording tape of claim 11, wherein the magnetic side supports a net uncompressed density of at least 60 MB/in² utilizing the linear density of at least 275 kbpi.

13. The magnetic recording tape of claim 11, wherein the magnetic recording tape is processed with inline calendering defined by less than 2000 lb/in maximum nip pressure, the resulting magnetic recording tape being less than 10 microns thick.

14. The magnetic recording tape of claim 11, wherein the magnetic recording layer has a remanent magnetization-thickness product (Mr*t) of less than about 2.5 memu/cm².

15. The magnetic recording tape of claim 11, wherein the magnetic particles of the magnetic layer have an orientation ratio of greater than 2.2.

16. A method of manufacturing a magnetic recording tape comprising an elongated substrate and a magnetic side, the method comprising:

forming the magnetic side consisting of:
   forming a support layer over the substrate, and
   forming a magnetic recording layer over the support layer to define a magnetic recording surface opposite the substrate, the magnetic recording layer consisting of magnetic particles and a lubricant and supporting a net uncompressed density of at least 30 MB/in² utilizing a linear density of at least 200 kbpi; and
calendering the magnetic recording tape to form the magnetic recording surface such that the magnetic side has an extracted BET surface area of greater than 1.0 m²/g, wherein the extracted BET surface area is calculated using Brunauer, Emmett and Tiller method for physical adsorption of gas molecules on a solid surface, where the extracted BET surface area is measured after the lubricant has been removed from the magnetic recording layer using solvent extraction.

17. The method of claim 16, wherein calendering the magnetic recording tape includes moving the magnetic recording tape through a plurality of nip stations defined between adjacent calender rollers, wherein the nip pressure applied to the magnetic recording tape at each nip station is less than 2000 lb/in.

18. The method of claim 17, wherein each of the calender rollers has a temperature below 175° F.

* * * * *